Nov. 1, 1955  P. B. GLESSNER  2,722,456
STABLE SPRAYING APPARATUS
Filed April 10, 1953
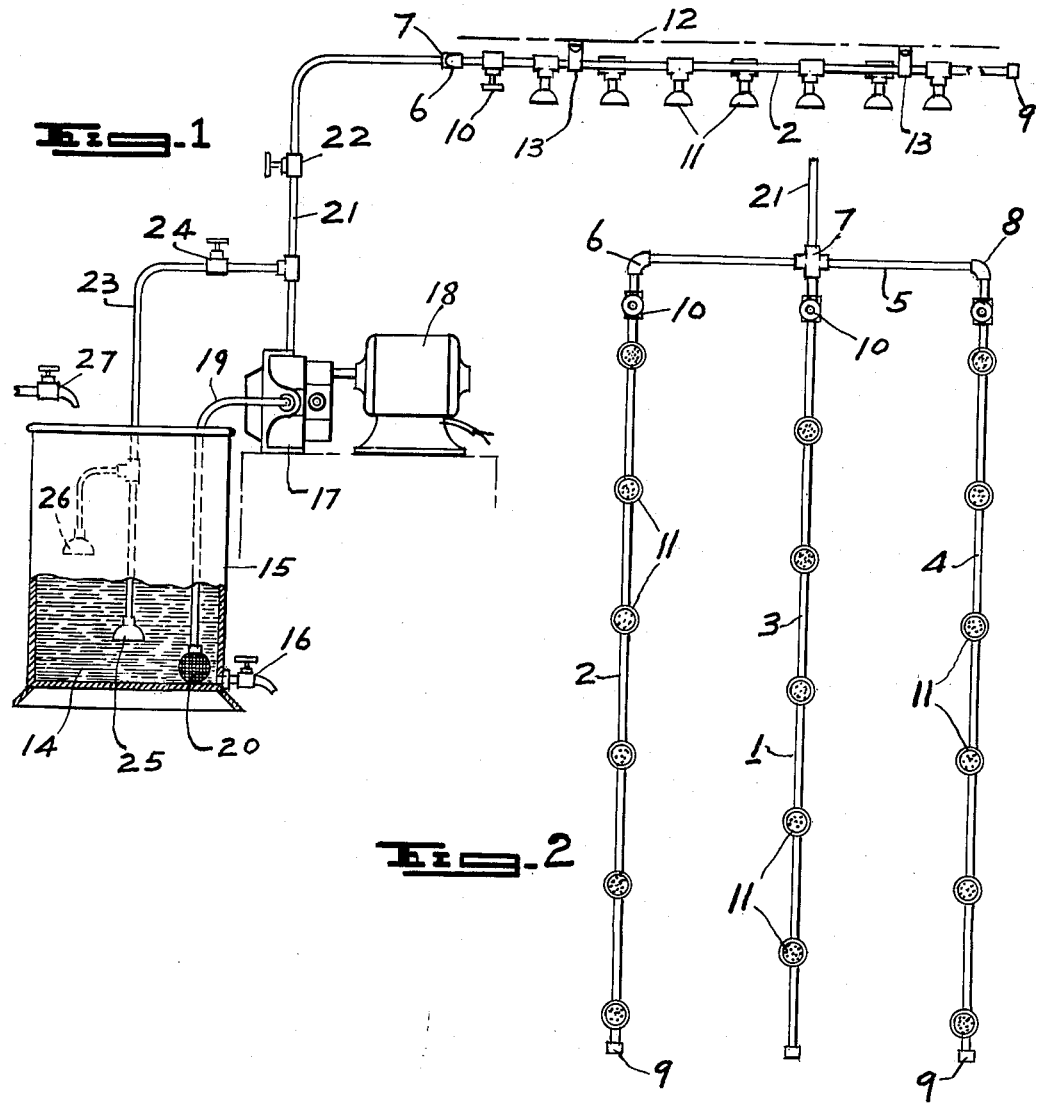
INVENTOR.
PAUL B. GLESSNER
BY
ATTORNEY

United States Patent Office 2,722,456
Patented Nov. 1, 1955

2,722,456

STABLE SPRAYING APPARATUS

Paul B. Glessner, Somerset, Pa., assignor of one-half to Robert A. Gilmour, Somerset, Pa.

Application April 10, 1953, Serial No. 348,058

1 Claim. (Cl. 299—58)

This invention relates to a spraying apparatus, and important objects and advantages thereof are to provide a spraying apparatus of the character described, which is designed and intended for permanent installation in a dairy barn or the like, which is effectively operable for spraying an insecticide or analogous prepared solutions around the stable housing cattle, or for spraying the cattle themselves, for the obvious purpose of eradicating vermin of any nature, and for treating any other untoward conditions and disorders invariably attending the maintenance and housing of cattle, and which may be conveniently operated and controlled by any one of ordinary skill.

Further objects of the invention are to provide a device of the class described, which is simple in its construction and arrangement, durable and compact, and comparatively economical in its manufacture, installation, operation, maintenance, and use.

With the foregoing and other objects in view which will appear as the description proceeds, the invention resides in the novel construction, combination and arrangement of parts herein specifically described and illustrated in the accompanying drawing, but it is to be understood that the latter is merely illustrative of an embodiment of the invention, and that changes in the form, proportions and details of construction may be resorted to that come within the scope of the claim hereunto appended.

In the drawing wherein like numerals of reference designate corresponding parts throughout the several views:

Figure 1 is a side elevational view of a spraying apparatus constructed in accordance with the invention.

Figure 2 is a bottom or underside view of the sprayer frame embodied in the invention.

Referring in detail to the drawing, the improved spraying apparatus comprises a frame structure 1, consisting of a plurality of elongated frame pipes, respectively indicated at 2, 3, and 4, and a cross pipe 5. One end of each of the elongated pipes is communitively connected with the cross pipe by a suitable pipe fitting, respectively indicated at 6, 7, and 8. The other end of each of the elongated pipes is free and is closed by a cap 9.

The elongated frame pipes 2, 3, and 4 extend in spaced, parallel relation to each other, and each is provided with a suitable fluid control valve 10, which is disposed adjacent to the connection of the elongated frame pipe with the cross pipe 5.

Each of the frame pipes 2, 3, and 4 carries a plurality of depending, communitively joined spray nozzles 11. The spray nozzles on each of the frame pipes are positioned in uniformly spaced relation to each other, with the spray nozzles of each frame pipe preferably being disposed in staggered relation to the spray nozzles of the adjacent frame pipes. The spray nozzles may be of any suitable construction and operation to provide the required density and dispersion of the spray stream to best meet conditions found in practice.

The whole frame structure 1 is intended for permanent installation by securing the structure against the ceiling 12 of the structure housing cattle, or by suspending the frame structure from the ceiling by means of hangers 13, or in any other suitable manner.

The prepared spray solution 14 is contained in a suitable storage tank 15, which is provided with a drain cock 16 at its bottom end, and with a faucet 27 at its top connecting with the water supply.

The spraying solution 14 is forced, under the required pressure, from the storage tank 15 to the spraying nozzles 11, by means of a suitable pump 17, which is operated by an electric motor 18, or by any other source of suitable power. The pump 17 may be a gear pump of the standard by-pass valve type, or of any other suitable construction and operation to provide the required pressure for the successful and effective operation of the sprayer apparatus.

A fluid inlet pipe 19 is connected with the pump 17 and depends into the storage tank 15 with the free lower end thereof being disposed adjacent to the bottom of the tank and being provided with a screening member 20 to prevent the entrance of any extraneous matter into the pump. A fluid discharge pipe 21 is joined with the pump and connects with the pipe fitting 7 in the cross pipe 5 of the frame structure 1. A control valve 22 is mounted in the discharge pipe 21 for controlling the flow of the solution 14 from the storage tank 15 to the spraying nozzles 11.

A branch pipe 23, provided with a control valve 24, is communicatively connected with the discharge pipe 21 between the connection of the latter with the pump 17 and the control valve 22 mounted in the discharge pipe. The branch pipe is provided with a control valve 24, and supports a pair of solution agitating nozzles, respectively indicated at 25 and 26, which depend into the storage tank 15. The nozzle 25 is disposed adjacent to the bottom of the tank, and the nozzle 26 is positioned approximately midway of the height of the storage tank. The operation of the nozzles 25 and 26 will thoroughly agitate, mix and stir the spraying solution 14 in the storage tank 15 by spraying action from the nozzles 25 and 26 effected by the operation of the pump 17.

It will be apparent that by closing the control valve 22 and opening the control valve 24, the solution agitating operation is effected independently of the general spraying operation, and that by opening both of the control valves 22 and 24, the solution mixing operation may be made and continued while the disinfecting spraying operation through the spraying nozzles 11 is in progress.

It will here be noted that by providing each of the frame pipes 2, 3, and 4, with an individual control valve 10, the series of spraying nozzles 11 of any one of the frame pipes may be controlled and regulated, to best meet conditions found in practice, independently of the series of spraying nozzles 11 carried by any other of the frame pipes.

The present invention provides a most efficient device of its kind, in which all of the involved pipe preferably consists of copper tubing, which may be entirely constructed, assembled and installed from stock items, which embodies novel means for controlling and regulating the solution agitating and spraying operations, and which may be economically and successfully employed for the purposes and in the manner herein set forth.

What I claim is:

An insecticide solution spraying apparatus for permanent installation in a stable comprising, in combination, a tank for containing the solution, a plurality of horizontally disposed elongated pipes, supporting members for suspending said elongated pipes from the ceiling of the stable, a cross pipe communitively connected with one end of each of said elongated pipes, the other end of each of said elongated pipes being free and closed, a plurality of spraying nozzles carried by each of said elongated pipes, a control valve mounted in each of said elongated pipes and being disposed adjacent to said cross pipe, a power operated pump, a solution discharge duct connected with said pump and with said cross pipe, a branch duct formed with a pair of free ends connected with said discharge pipe and extending into said tank, a pair of spraying nozzles connected with respective free ends of said branch duct, one of said pair of spraying nozzles being disposed adjacent to the bottom of said tank and the other of said pair of nozzles being disposed approximately centrally intermediate of the height of said tank, a control valve mounted in said discharge duct and being disposed above the connection of said branch duct with said discharge duct, a control valve mounted in said branch duct, an inlet duct connected with said pump and depending into said tank, a screening element connected at the free end of said inlet duct and being disposed at the bottom of said tank, and a drain cock connected with said tank and being disposed adjacent to the bottom of said tank.

References Cited in the file of this patent

UNITED STATES PATENTS

| | | |
|---|---|---|
| 870,766 | Eaton | Nov. 12, 1907 |
| 1,058,464 | Pritchard | Apr. 8, 1913 |
| 1,233,119 | Parker | July 10, 1917 |
| 2,462,034 | Zeck | Feb. 15, 1949 |
| 2,582,802 | Terrell | Jan. 15, 1952 |